United States Patent
Smith (10) Patent No.: US 11,971,068 B2
(45) Date of Patent: Apr. 30, 2024

(54) APPARATUS AND METHOD FOR REPAIR OF SHIFT CABLE ENDS IN VARIOUS MOTOR VEHICLES

(71) Applicant: Loring Smith, Lakeland, FL (US)

(72) Inventor: Loring Smith, Lakeland, FL (US)

( * ) Notice: Subject to any disclaimer, the term of this patent is extended or adjusted under 35 U.S.C. 154(b) by 0 days.

(21) Appl. No.: 17/855,143

(22) Filed: Jun. 30, 2022

(65) Prior Publication Data
US 2024/0003378 A1    Jan. 4, 2024

(51) Int. Cl.
*F16C 1/12*    (2006.01)
*F16C 1/14*    (2006.01)

(52) U.S. Cl.
CPC ..................... *F16C 1/14* (2013.01)

(58) Field of Classification Search
CPC .... F16C 1/12; F16C 1/14; F16C 1/145; F16H 59/02
See application file for complete search history.

(56) References Cited

U.S. PATENT DOCUMENTS

| | | | | |
|---|---|---|---|---|
| 5,518,332 | A * | 5/1996 | Katoh | F16C 1/108 |
| | | | | 285/305 |
| 6,748,820 | B2 * | 6/2004 | Ruhlander | F16C 11/04 |
| | | | | 403/141 |
| 7,044,018 | B2 * | 5/2006 | Sanchez | F16C 1/108 |
| | | | | 403/135 |
| 9,587,669 | B2 * | 3/2017 | Koontz | F16C 1/14 |
| 10,215,273 | B2 * | 2/2019 | Smith | F16H 59/04 |
| 10,619,723 | B2 * | 4/2020 | Smith | F16C 43/02 |
| 11,415,213 | B1 * | 8/2022 | Smith | F16H 61/36 |
| 2021/0404500 | A1 * | 12/2021 | Horinaka | F16C 1/14 |
| 2022/0307589 | A1 * | 9/2022 | Smith | F16H 59/0278 |
| 2024/0003379 | A1 * | 1/2024 | Smith | F16C 43/02 |

FOREIGN PATENT DOCUMENTS

DE        10216903 B4 *  2/2004  ............. F16C 1/108

* cited by examiner

*Primary Examiner* — Adam D Rogers
(74) *Attorney, Agent, or Firm* — Todd A. Jennings (57) ABSTRACT

The present invention is directed at a bushing for coupling the shift cable end and shift lever in motor vehicles where the shift cable end comprises an oblong body having a coupling aperture, a notch, a front shelf and rear shelf protruding into the coupling aperture, and the shift lever is comprised of a base, a shaft, a neck and a head, and the two are coupled through a bushing and retaining clip. The bushing comprises a seating member configured to sit within the coupling aperture having a bore, a securing member to engage the notch, two members extending from the top surface of the seating member to provide stability and define a space to accommodate the retaining clip, and angled surfaces extending from the seating member to engage the retaining clip. The bottom surface of the seating member has recesses to accommodate the front and rear shelves.

18 Claims, 13 Drawing Sheets

APPARATUS AND METHOD FOR REPAIR OF SHIFT CABLE ENDS IN VARIOUS MOTOR VEHICLES

CROSS-REFERENCES TO RELATED APPLICATIONS

Not Applicable

STATEMENT REGARDING FEDERALLY SPONSORED RESEARCH

Not Applicable.

NAMES OF PARTIES TO JOINT RESEARCH AGREEMENT

Not Applicable

REFERENCE TO A SEQUENCE LISTING

Not Applicable.

BACKGROUND OF THE INVENTION

(1) Field of Invention

The present invention relates to an apparatus and method for repairing the transmission shift control linkage of various motor vehicles. The transmission shift control linkage of many motor vehicles generally consists of a shift cable that connects the gear selector or shift lever to the motor vehicle's transmission. The shift cable end is coupled with the gear selector or shift lever via a coupling mechanism that allows for the smooth operation of the shift linkage. In many motor vehicles, the factory-instilled shift cable ends are pre-fitted with a factory-made coupling mechanism consisting of metal or plastic clips or similar appurtenances that engage the coupling member of a shift lever and allow for the coupling of a shift lever to the shift cable end. These factory-made coupling mechanisms, which are made a part of the shift cable ends, degrade or become damaged over time, allowing the shift cable end to become decoupled from the gear selector or shift lever, making it impossible for the operator of the automobile to engage the shift and the transmission. Presently, the failure of a transmission shift cable and coupling mechanism in various motor vehicles requires the removal and replacement of the entire shift cable. This is because the factory-made coupling mechanisms that are incorporated into the shift cable ends are not capable of being replaced or repaired. The replacement of the shift cable to achieve the repair of the shift cable end coupling mechanism can prove unnecessarily costly and time consuming.

(2) Background Art

There are a large number of bushings in wide use in many fields. However, there are not many specialized bushings in the art related to the specific use in replacing existing coupling mechanisms in transmission shift cable assemblies. The present inventor has previously disclosed in U.S. Pat. Nos. 10,619,723, 10,215,273, application Ser. No. 17/206,001, and application Ser. No. 17/703,445 apparatuses and methods for repairing the couplings between multiple shift cable ends and shift levers in various motor vehicles. However, the specialized bushings disclosed in these prior patents were materially different from the apparatus and method disclosed in the instant invention.

SUMMARY OF INVENTION

Accordingly, it is the object of the present invention to provide a specialized bushing and method of installation into the transmission shift cable end that provides for the proper coupling of the shift cable end and shift lever without the replacement of the entire shift cable. In accordance with the invention, the replacement of the factory-made shift cable end coupling mechanism is achieved by a method utilizing a specialized bushing that properly couples the shift lever to the shift cable end and avoids the time and costs associated with the replacement of the entire shift cable.

The object of the invention may be accomplished by inserting a specialized bushing into the shift cable end, inserting the shift lever into the bushing, and using an existing retaining clip to secure the lever within the bushing. In particular embodiments, the shift cable end may comprise an oblong body having a front end and back end, and an inner and outer surface that define a coupling aperture. The oblong body carries a front shelf and rear shelf that extend into the coupling aperture from the inner surface of the front and back ends of the oblong body respectively. The base of both shelves are flush with the bottom surface of the oblong body and are of a height less than the height of the oblong body. In some embodiments, the front shelf may have the remnants of a bore from the existing coupling mechanism that has been removed from the shift cable end, such that the face of the front shelf may have a semi-circular member that cuts into the face of the front shelf and extends vertically and horizontally from the front shelf. The front shelf may also have a protruding member rising along the center of the front shelf and extending horizontally from inner surface of the oblong body to the semi-circular member. The top face of the protruding member may be on the same plane as the top face of the semi-circular member. The shift cable end also has a notch in the inner surface of the front end of the oblong body that extends from the top of the protruding member to the top surface of the oblong body.

The shift lever may be comprised of a base, a shaft, a neck, and a head. In some embodiments, the base may be a disc, the shaft may be an elongated cylinder, the neck a cylinder and the head a truncated cone. The neck is smaller in size than the shaft and the head such that it creates an annular groove around the shift lever such that the arms of a horseshoe-shaped retaining clip can be secured between the shaft and head.

The specialized bushing needed to further the intent of the invention may comprise an oblong seating member configured to sit within the coupling aperture of the shift cable end. In some embodiments, the seating member will be of the same size and shape as the coupling aperture. A bore runs from the bottom surface to the top surface of the seating member and is sized to allow the passage of the shaft. The bore is the same length as the shaft and is intended to receive the shaft and permit the neck and head of the shift lever to pass through the bore and top surface of the seating member. A securing member extends both vertically from the top surface and horizontally from the front end of the seating member and is configured to fit within the notch of the shift cable end. In some embodiments, the securing member maybe rectangular or form a L shape having a height and width equal to the height and width of the notch. Two angled surfaces rise from the top surface of the seating member to each side of the securing member. The angled surfaces provide a surface to make contact with the arms of the retaining clip when installed in the bushing and shift lever.

Two supporting members rise vertically from the top surface of the seating member and are contoured to fit within the coupling aperture. The space between the inner surfaces of the supporting members creates a space above the top surface of the seating member for the retaining clip to be installed. The supporting members also provide the bushing with additional stability as it experiences the forces applied to it during the operation of the shift cable end and shift lever. In particular embodiments, the supporting members are of such a height so that the distance between the top of the supporting members and the bottom surface of the seating member is equal to the height of the coupling aperture. Thus, the bushing is fully seated in the coupling aperture when the top of the supporting members are flush with the top surface of the oblong body. This aspect of the supporting members thus tells the installer when the bushing is properly seated in the coupling aperture.

The bottom surface of the seating member has several recesses to accommodate to the front shelf and rear shelf. The recesses can be of any configuration necessary to accommodate the configuration of the front and rear shelf of any particular shift cable end. In some embodiments, the seating member has a first recess equal to the shape and size of the front shelf, a second recess equal in shape and size to the semi-cylindrical member that borders the bore, a third recess on the same plane as the second recess that creates a notch above the first recess to accommodate the protruding member. These recesses are configured such that the seating member sits on the front and rear shelves when seated in the coupling aperture. The first, second, and third recesses are cantered along the same axis as the center of the bore.

In particular embodiments of the invention, the shift cable end and shift lever may be operably coupled by removing the existing coupling mechanism from the shift cable end using pliers or cutting tools. Care must be taken to remove the retaining clip from the existing mechanism. The front shelf and rear shelf are then trimmed using pliers, cutting tools and/or filing tools to ensure the space between the two shelves is large enough to accommodate the bushing. The bushing is then inserted into the coupling aperture by aligning the securing member with the notch and pressing the bushing into the coupling aperture until the recesses engage with the shelves and the top of the supporting members and securing member are flush with the top surface of the oblong body. The shift lever is then inserted into the bushing by aligning the head and bore and passing the neck and head through the bore such that the shaft is seated in the bore, the bottom surface of the seating member makes contact with the disc, and the neck and head appear above the top surface of the seating member. The retaining clip is then placed above the top surface of the seating member with the arms reaching towards the front end of the seating member, and the arms are pressed down and over the bead of the shift lever until they pass the head and retract beneath the head and against the neck and a portion of the arms rest against the angled surfaces of the seating member.

DETAILED DESCRIPTION

Figure 1:
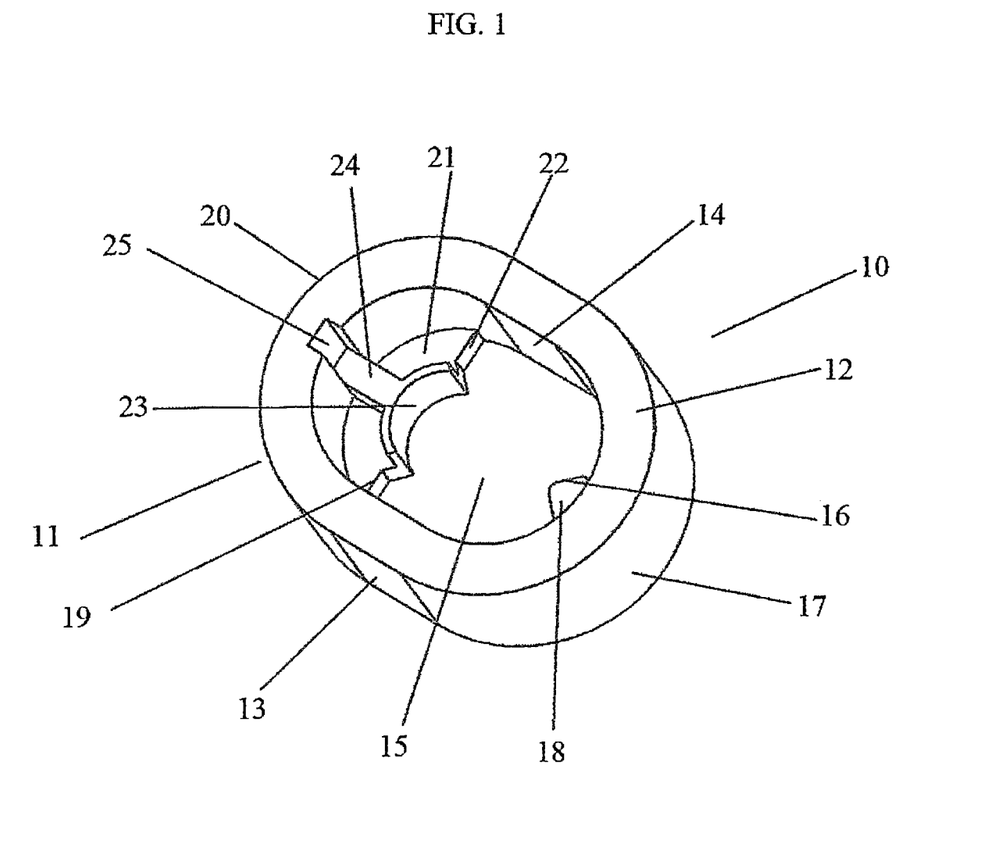
FIG. 1 is a top perspective illustration of an exemplary shift cable end.
Figure 2:
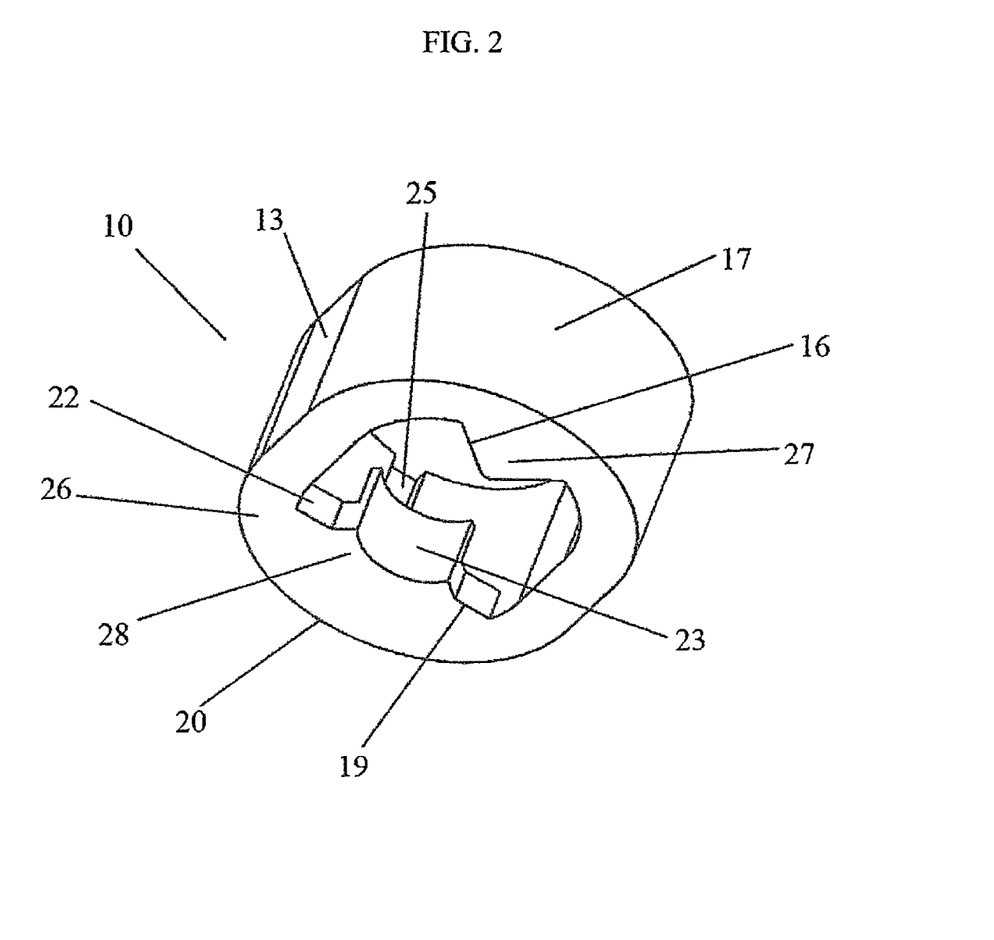
FIG. 2 is a bottom perspective illustration of an exemplary shift cable end.
Figure 3:
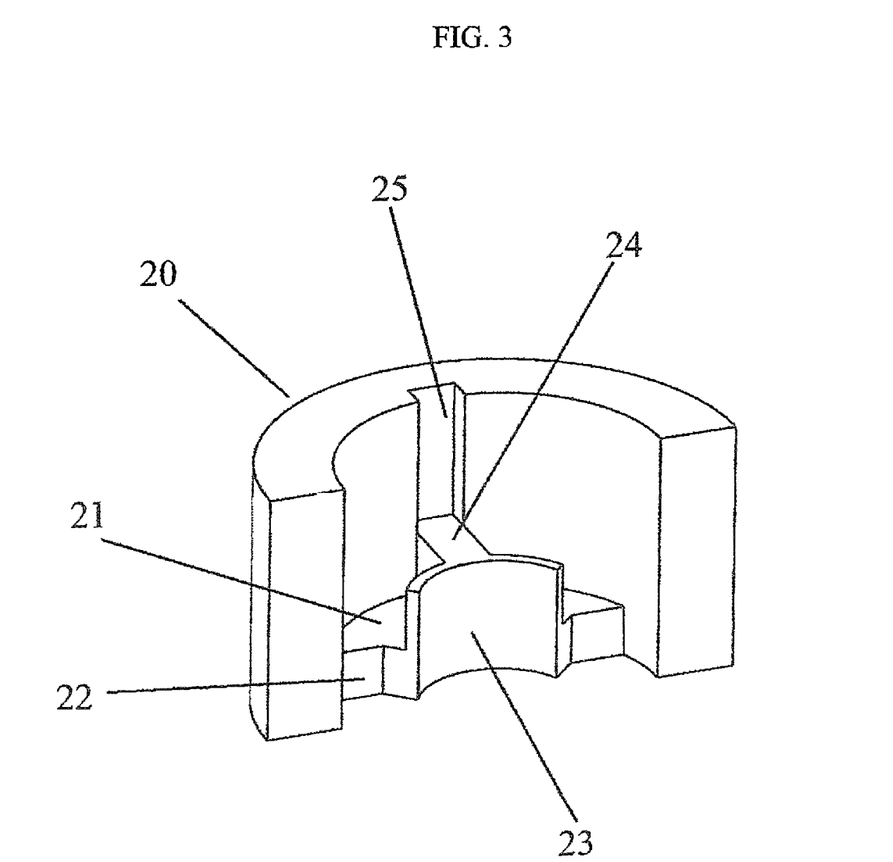
FIG. 3 is a cross-sectional perspective illustration of an exemplary shift cable end.

Referring to FIG. 1, FIG. 2 and FIG. 3, an exemplary shift cable end is illustrated. In this example, the shift cable end 14 is comprised of an oblong body 11 having a top surface 12, a bottom surface 26, and an outer surface 13 and inner surface 14 that define an oblong coupling aperture 15. A rear shelf 16 extends from the inner surface 14 of the back end 17 of the oblong body 11 into the coupling aperture 15. In this particular embodiment, the rear shelf 16 is triangular. The base 27 of the rear shelf 16 is flush with the bottom surface 26 of the oblong body 11 and the top face 18 of the rear shelf 16 is situated such that the height of the year 16 is less than the height of the coupling aperture 15. A front shelf 19 extends from the inner surface 14 of the front end 20 of the oblong body 11. The base 28 of the front shelf 19 is flush with the bottom surface 26 of the oblong body 11 and the top face 21 of the front shelf 19 is situated such that the height of the front shelf 19 is less than the height of the coupling aperture 15.

The front shelf 19 carries the remnant of a bore along its outer face 22 that forms a semi-circular member 23 that cuts into the outer face 22 and extends vertically from the front shelf 19. The semi-circular member 23 also extends horizontally beyond the outer face 22 of the front shelf 19. The height of the semi-circular member 23 is less than the height of the coupling aperture 15. The front shelf 19 also has a protruding member 24 jutting up from its top face 21. In this particular example, the protruding member 24 is rectangular and extends from the top face 21 of the front shelf 19 and is of a height less than the height of the coupling aperture 15 and equal to the distance between the top of the semi-circular member 23 and the top face 21 of the front shelf 19.

The front end 20 of the oblong body has a notch 25 on the inner surface 14 that runs vertically from the top surface 12 of the oblong body 11 partially down the inner surface 14 of the oblong body 11. In this example, the notch 25 is rectangular and extends from the top surface 12 of the oblong body 11 to the top of the protruding member 24 of the front shelf 19.

Figure 7:
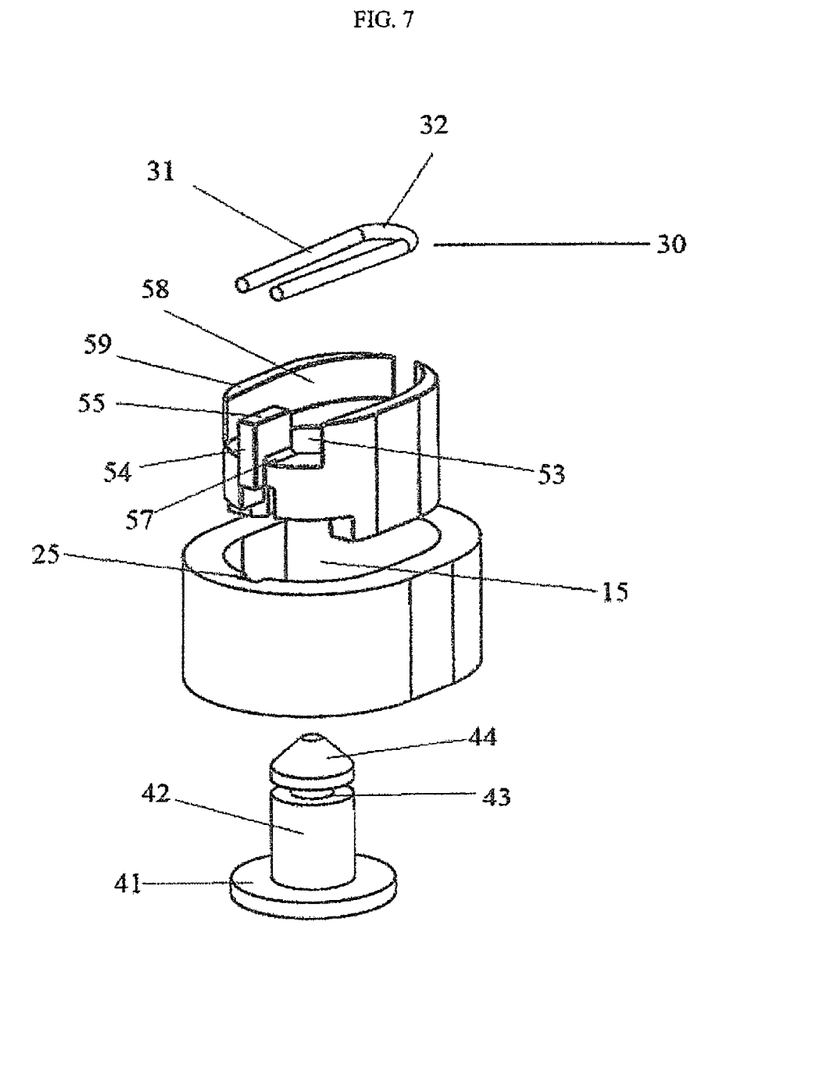
FIG. 7 is a perspective exploded view of an exemplary retaining clip, bushing, shift cable end and shift lever.
Figure 8:
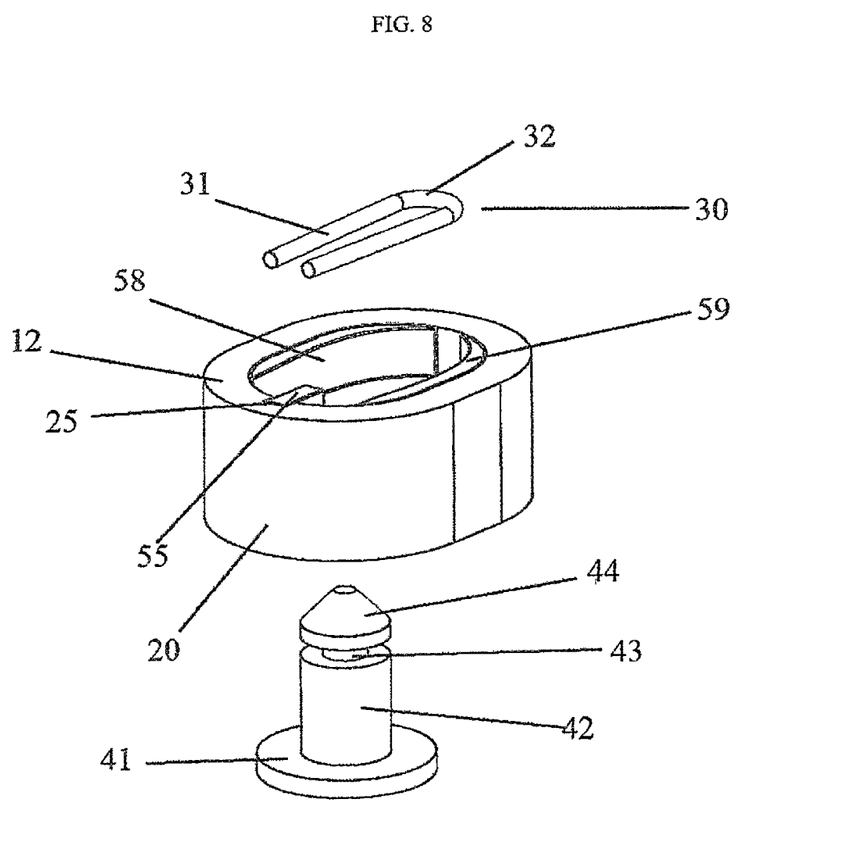
FIG. 8 is perspective view of an exemplary retaining clip, exemplary bushing installed in an exemplary shift cable end, and an exemplary shift lever.
Figure 9:
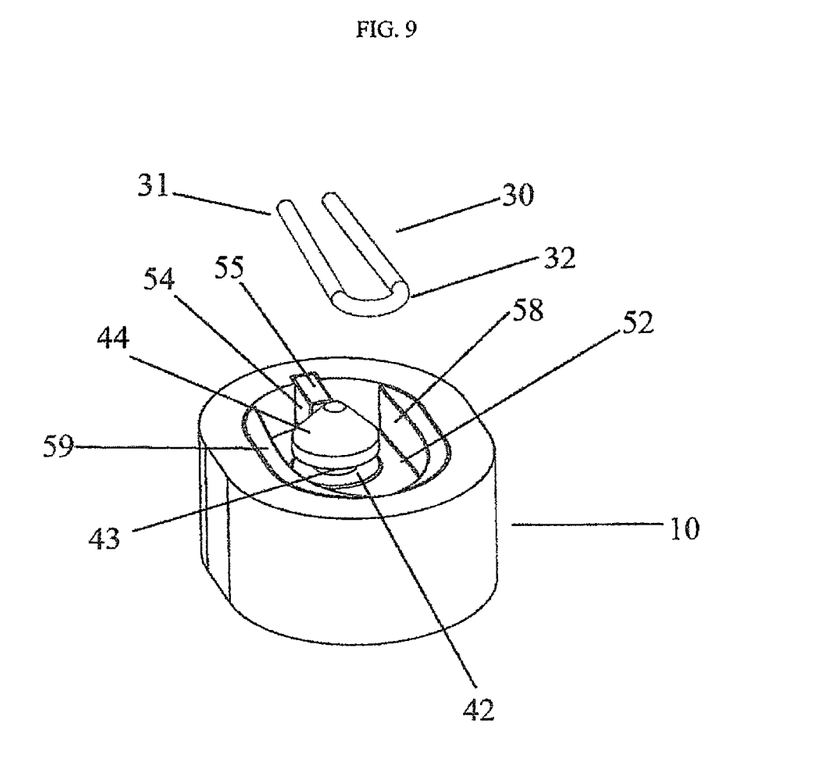
FIG. 9 is a perspective view of an exemplary retaining clip and shift lever inserted into an exemplary bushing installed in an exemplary shift cable end.
Figure 10A:
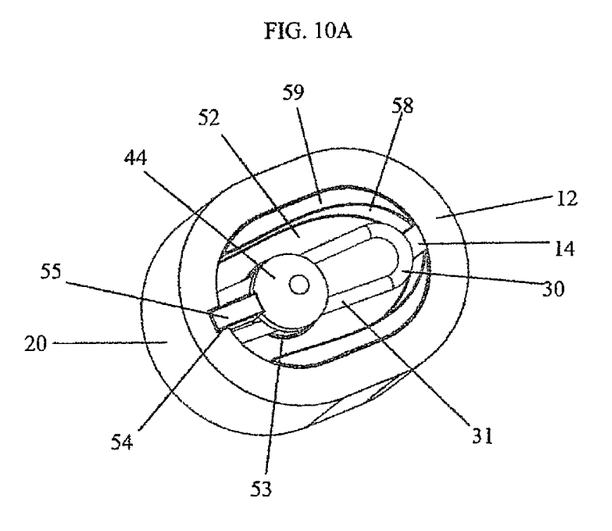
FIG. 10A is a top perspective view of an exemplary retaining clip, shift lever, bushing and shift cable end fully installed.
Figure 10B:
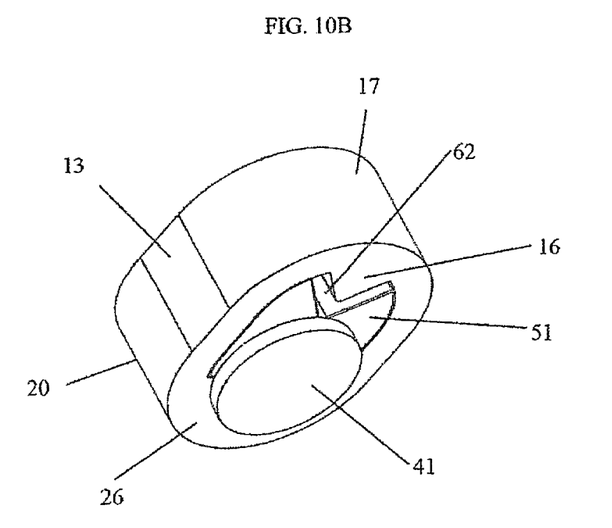
FIG. 10B is a bottom perspective view of an exemplary shift lever, bushing and shift cable end fully installed.

The factory installed coupling mechanism (not shown) of this particular shift cable end 10 includes a retaining clip 30 that is utilized in conjunction with the instant invention to help retain the shift lever 40 within the bushing 50. Referring to FIG. 7, an example of a retaining clip 30 is illustrated. The retaining clip 30 is comprised of a single piece of metal wire that has been bent into a horseshoe shape creating two arms 31 extending horizontally outwards at an inward angle such that the distance between the two arms 31 decreases as they stretch from the elbow 32 of the retaining clip 30.

Figure 4:
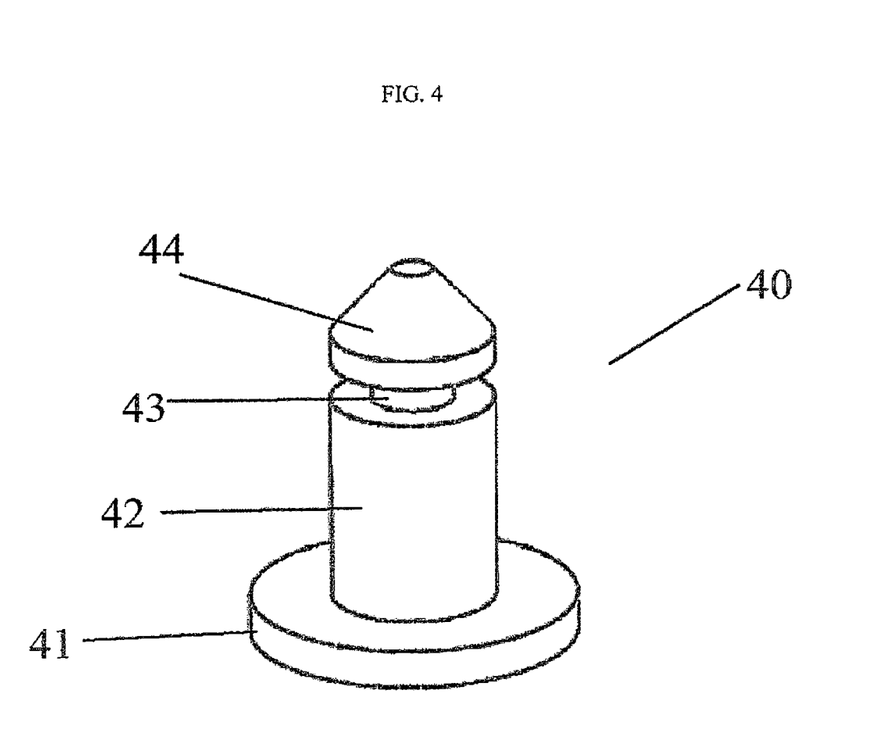
FIG. 4 is a perspective illustration of an exemplary shift lever.
Figure 5A:
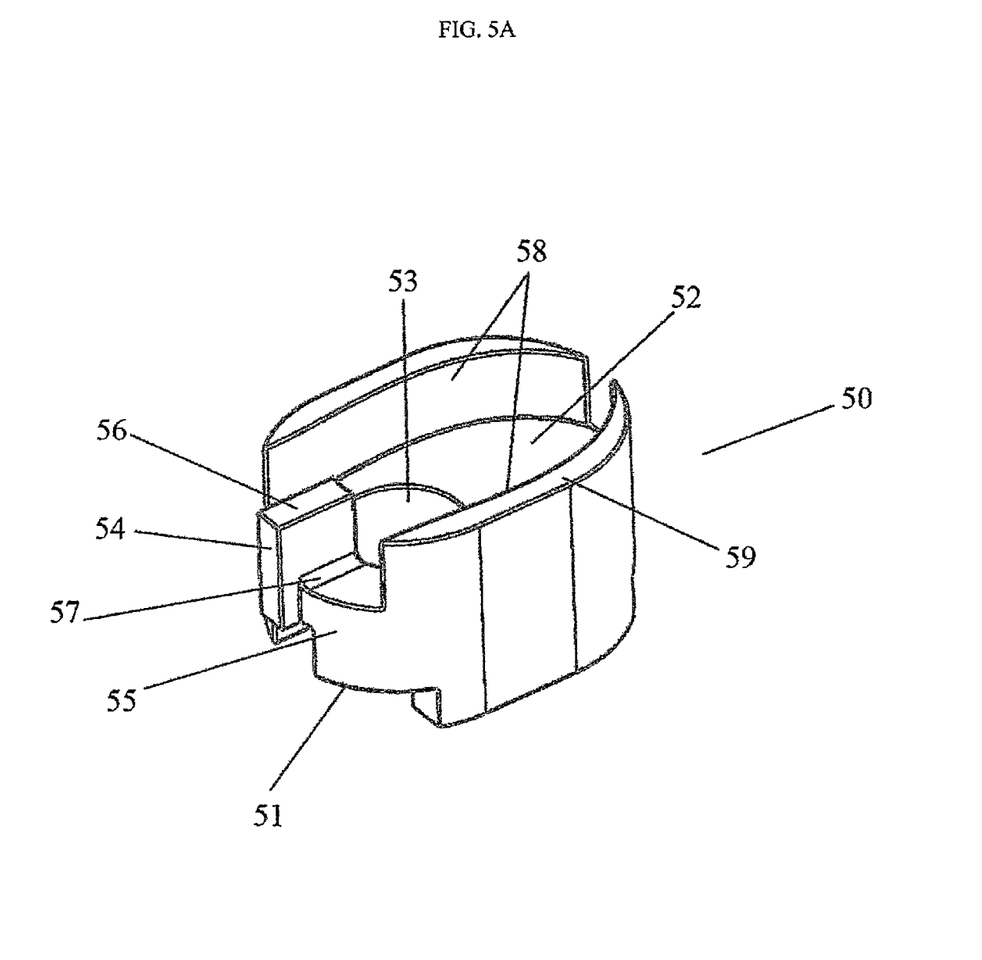
FIG. 5A is a top perspective illustration of an exemplary bushing.
Figure 5B:
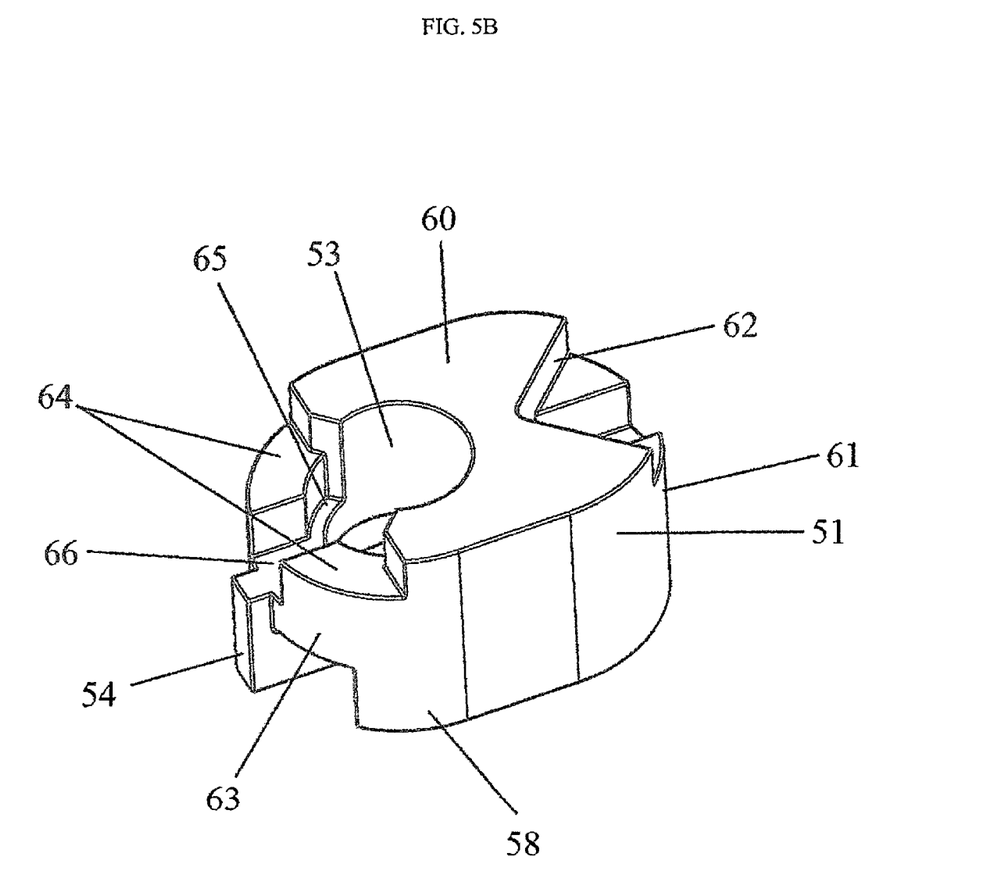
FIG. 5B is a bottom perspective illustration of an exemplary bushing.
Figure 6A:
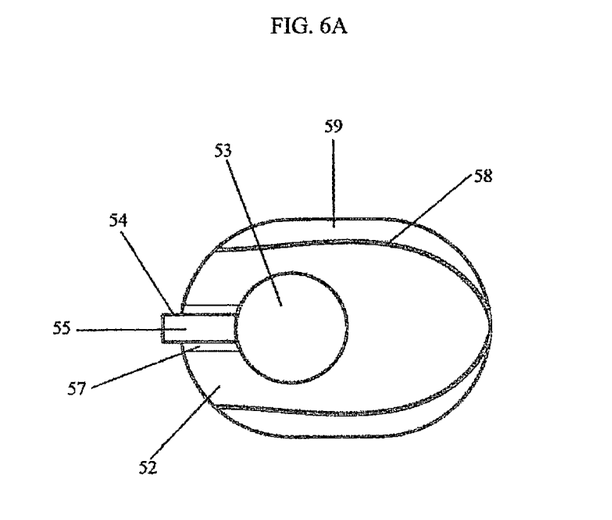
FIG. 6A is top elevation illustration of an exemplary bushing.
Figure 6B:
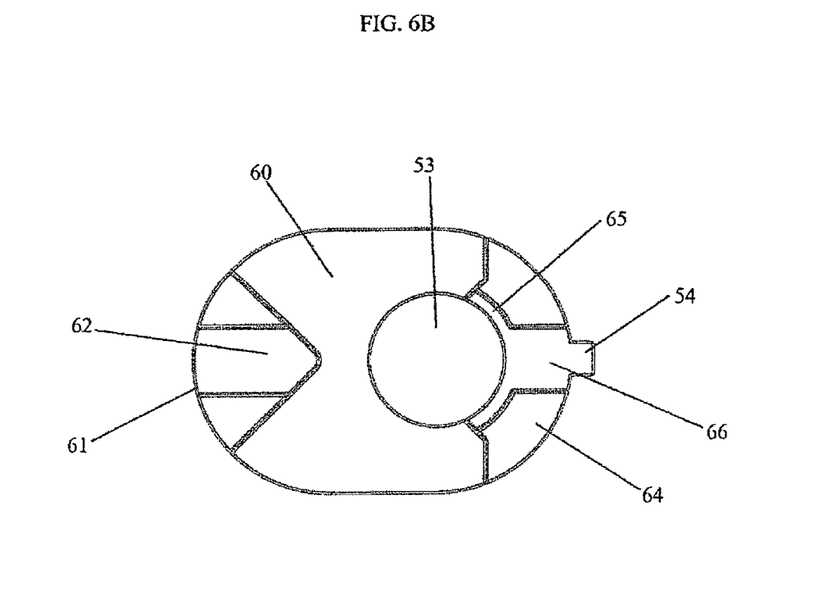
FIG. 6B is bottom elevation illustration of an exemplary bushing.

Referring to FIG. 4, an exemplary shift lever 40 is illustrated. The shift lever 40 is inserted into the shift cable end 10 and held in place by a retaining clip 30 to operably couple with the shift cable end 10 through the use of a bushing 50. This particular example of a shift lever includes a base 41, a shaft 42, a neck 43 and a head 44. In this example, the base 41 is comprised of a disc that sits on the elongated member (not shown) of the shift lever 40, the shaft 42 is a cylindrical member of a diameter less than the diameter of the base 41 that extends upward from the base 41, the neck 43 is a cylindrical member having a diameter less than the diameter of the shaft 42, and the head 44 is a truncated conical member having a base diameter greater than the diameter of the neck 43. The neck 43 is of a height marginally greater than the diameter of the retaining clip 30 and the difference in the diameters of the neck 43 and head 44 is greater than the diameter of the retaining clip 30 such that the arms 31 of the retaining clip 30 may be held in place under the head 44 and against the neck 43.

Referring to FIG. 5a, FIG. 5b, FIG. 6a, and FIG. 6b, an exemplary bushing for carrying out the object of the invention is illustrated. The bushing 50 is comprised of an oblong seating member 51 having a top surface 52 and a bottom surface 60. The vertical distance between the top surface 52 and the bottom surface 60 is approximately the same as the length of the shaft 42 of the shift lever 40. The seating member 51 carries a bore 53 that runs from the top surface 52 to the bottom surface 60. In this particular embodiment, the bore 53 is cylindrical and has a diameter marginally greater than the shaft 42 of the shift lever 40 and a length equivalent to the length of the shaft 42. However, the bore 53 could be of any configuration necessary to accommodate the configuration of the shall of a shift lever. A securing member 54 protrudes both vertically from the top surface 52 of the seating member 51 and horizontally from the front end 55 of the seating member 51. The securing member 54 engages the notch 25 in the oblong body 11 of the shift cable end 10 and also provides support for the arms 31 of the retaining clip 30. In this particular embodiment, the securing member 54 is rectangular in shape, forming an L about the front end 55 of the seating member 51, and is configured to slide into the notch 25 in the oblong body 11 of the shift cable end 10. The securing member 54 extends vertically such that the top face 56 of the securing member 54 is flush with the top surface 12 of the oblong body 11 when the bushing 50 is fully seated within the coupling aperture 15. An angular surface 57 rises from the top surface 52 of the seating member 51 on both sides of the securing member 54 and meets the securing member 54 to provide a seat for the arms 31 of the retaining clip 30.

The seating member 51 carries two supporting members 58 that extend vertically from the top surface 52 of the seating member 51 and are contoured to fit within the coupling aperture 15. When the bushing 10 is installed within the coupling aperture 15, the supporting members 58 provide additionally stability to the bushing 50 during operation of the shift lever 40 and shift cable end 10. Additionally, when installed, the top surfaces 59 of the supporting members 58 will be flush with the top surface 12 of the oblong body 11 of the shift cable end 10 to assist the user in determining when the bushing 50 has been properly seated in the coupling aperture 15. The supporting members 58 are of such a width that the distance between their inner faces provides ample space for the installation of the retaining clip 30 within the bushing 50.

The bottom surface 60 of the seating member 51 contains several recesses to accommodate the configurations of the front shelf 19 and rear shelf 16 of the oblong body 11. In this particular embodiment, the back end 61 of the seating member 51 has a triangular recess 62 along its bottom surface 60 to accommodate the rear shelf 16 of the shift cable end 10. Additionally, the front end 63 of the seating member 51 has a first semi-circular recess 64 and a second semi-circular recess 65 along its bottom surface 60 to accommodate the front shelf 19 and semi-circular member 23 of the shift cable end 10. The second semi-circular recess 65 is deeper than the first and runs along the circumference of the bore 53. Both semi-circular recesses are radially aligned with the bore 53. A third recess 66 lies in the same plane as the second semi-circular recess 65 and creates a notch beneath the first semi-circular recess 64 to accommodate the protruding member 24 of the front shelf 19. When seated in the coupling aperture 15, these recesses provide surfaces on which the seating member 51 engages and sits upon the rear shelf 16, front shelf 19, semi-circular member 23 and protruding member 24 of the shift cable end 10.

In accordance with the present inventions, FIG. 7, FIG. 8, FIG. 9, FIG. 10A, and FIG. 10B, illustrate an exemplary method to replace the degraded or damaged coupling mechanism. Prior to installation, the existing coupling mechanism (not shown) is removed from the shift cable end and a cutting or filing tool is used to trim the rear shelf 16 and the semi-circular member 23 of the shift cable end 10 to ensure that the bushing 50 will sit within the coupling aperture 15. The bushing 50 is then inserted into the coupling aperture 15 by aligning the securing member 54 with the notch 25 and pressing the bushing 50 into the coupling aperture 15 until the top surfaces of the securing member 54 and supporting members 58 are flush with the top surface 12 of the oblong body 11 and the bottom surface 60 of the seating member 51 engages the bottom surface 26 of the oblong body 11 such that the seating member 51 is seated on the rear shelf 16 and front shelf 19 of the shift cable end 10.

The shift cable end 10 with the installed bushing 50 is then placed on the shift lever 40 by aligning the bore 53 of the bushing 50 with the head 44 of the shift lever 40 and inserting the shift lever 40 through the bore 53 until the head 44 and neck 43 of the shift lever 40 have passed through and beyond the bore 53 and top surface 52 of the seating member 51 and the bottom surface 60 of the bushing 50 is resting on the base 41 of the shift lever 40. The retaining clip 30 is then placed in the bushing 50 between the two supporting members 58 and over the head 44 of the shift lever 40 and the arms 31 are pressed down and over the head 44 until they retract underneath the head 44 and against the neck 43 of the shift lever 40 and engage the angular surfaces 57 and securing member 54 of the bushing 50.

Figure 11:
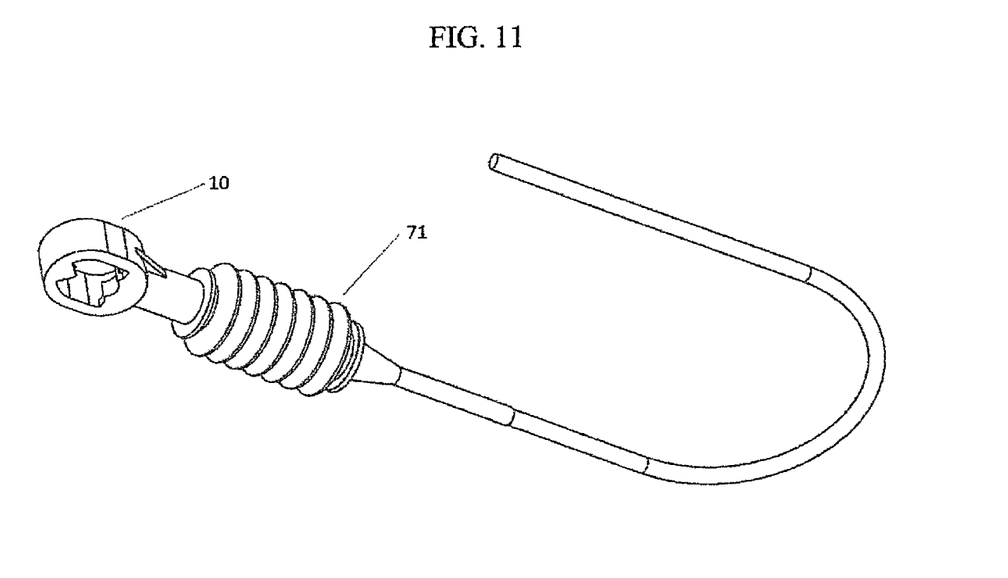
FIG. 11 is a perspective illustration of an exemplary shift cable end attached to an exemplary shift cable.
Figure 12:
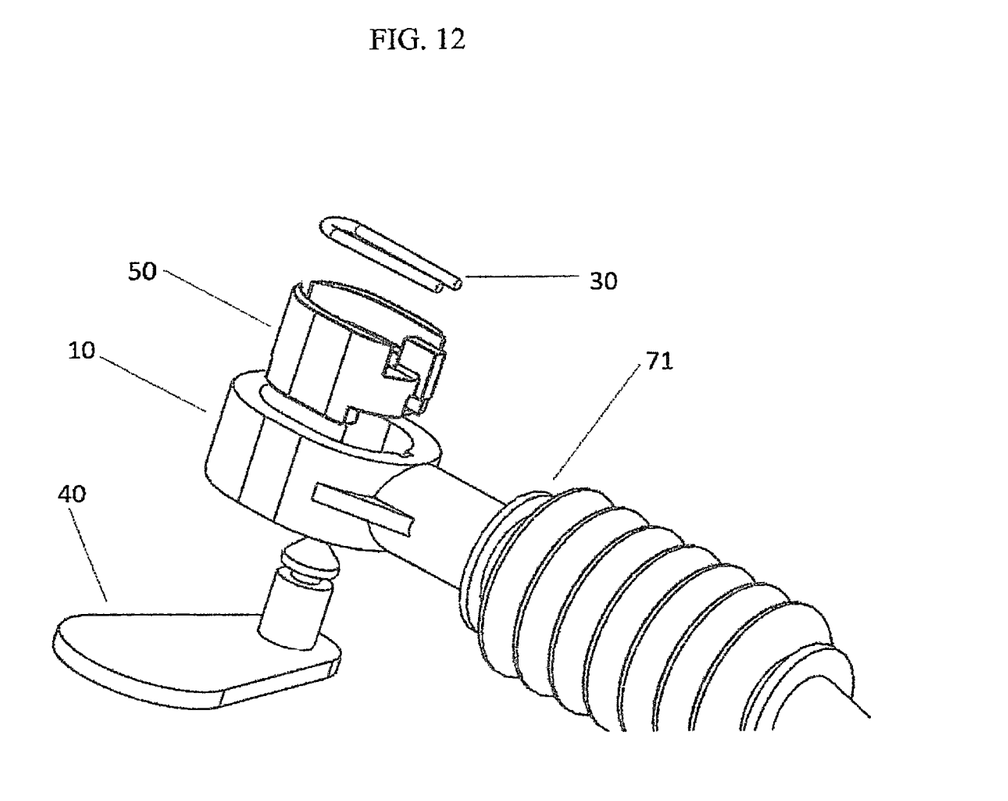
FIG. 12 is a perspective exploded view of an exemplary retaining clip, bushing, shift cable end attached to a shift cable, and shift lever.

FIG. 11 illustrates an exemplary shift cable end 10 attached to the shift cable 71. FIG. 12 illustrates an exemplary shift cable end 10, shift lever 40, bushing 50, and retaining clip 30 in relation to the shift cable 71.

The foregoing merely describes the present invention in an illustrative manner. The terminology employed is intended to be merely words of description, and not of limitation. It will thus be appreciated that that those skilled in the art will be able to make numerous modification and variations of the present invention in light of the above teachings. Such modifications and variations, while not illustrated or described herein, embody the principles of the present invention, and are within the spirit and scope of the appended claims.

The present inventor claims:

1. A bashing for coupling a shift cable end and shift lever, said shift cable end comprising an oblong body having a front end and back end, an outer surface and inner surface creating a coupling aperture, a front shelf extending from the inner surface of the front end of the oblong body into the coupling aperture, said front shelf having a protruding member rising vertically along the center of the front shelf and a semi-circular member rising vertically from the front shelf and perpendicular to the protruding member, said semi-circular member extending horizontally beyond the front shelf, a rear shelf extending from the inner surface of the back end of the oblong body into the coupling aperture, and a notch in the inner surface of the front end of the oblong body, said shift lever comprising a base, a shaft, a neck and a head, said shift cable end coupling with said shift lever through the assistance of a retaining clip comprising an elongated body bent such that the retaining clip has two arms, comprising:
 a seating member configured to sit within the coupling aperture having a first end and a second end, a top surface and a bottom surface, and an outer surface defining an oblong body;
 a bore within the seating member running from the bottom surface to the top surface of the seating member and forming a passage sized to receive the shaft of the shift lever;
 a securing member extending vertically and longitudinally from the first end of the seating member configured to engage the notch in the shift cable end;
 two angled surfaces rising from the top surface of the seating member to opposite sides of the securing member configured to engage the arms of the retaining clip;
 two supporting members rising vertically from the top surface of the seating member and running lengthwise along each side of the seating member;
 a first recess in the bottom surface of the seating member configured to accommodate the front shelf of the shift cable end;
 a second recess in the bottom surface of the seating member configured to accommodate the semi-circular member;
 a third recess in the bottom surface of the seating member configured to accommodate the protruding member; and
 a fourth recess in the bottom surface of the seating member configured to accommodate the rear shelf.

2. A bushing as in claim 1 wherein the seating member is the same shape as the coupling aperture and of such size to permit the seating member to pass into the coupling aperture.

3. A bushing as in claim 1 wherein the bore is the same shape as the shaft of the shift lever and of such size to permit the shaft of the shift lever, but not the base of the shift lever, to pass into the bore.

4. A bushing as in claim 1 wherein the securing member has a height and width equal to the height and width of the notch and is centered on the same axis as the center of the bore.

5. A bushing as in claim 1 wherein the supporting members are contoured to the shape of the seating member and coupling aperture, are of a height such that the distance between the bottom surface of the seating member and the top of the supporting members is equal to the depth of the coupling aperture, and are of a thickness such that the distance between the two supporting members defines a space above the top surface of the seating member large enough to accommodate the retaining clip.

6. A bushing as in claim 1 wherein the first recess is of a shape and size equivalent to the shape and size of the front shelf and is centered on the same axis as the center of the bore.

7. A bushing as in claim 1 wherein the second recess is the same shape and size as the semi-circular member, the second recess is centered on the same axis as the center of the bore and the second recess borders the bore.

8. A bushing as in claim 1 wherein the third recess is the same shape and size as the protruding member and is centered on the same axis as the center of the bore.

9. A bushing as in claim 1 wherein the fourth recess is the same shape and size as the rear shelf.

10. A method for coupling a shift cable end and shift lever, said shift cable end comprising an oblong body having a front end and back end, an outer surface and inner surface creating a coupling aperture, a front shelf extending from the inner surface of the front end of the oblong body into the coupling aperture, said front shelf having a protruding member rising vertically along the center of the front shelf and a semi-circular member rising vertically from the front shelf and perpendicular to the protruding member, said semi-circular member extending horizontally beyond the front shelf, a rear shelf extending from the inner surface of the back end of the oblong body into the coupling aperture, and a notch in the inner surface of the front end of the oblong body, said shift lever comprising a base, a shaft, a neck, and a head, said shift cable end coupling with said shift lever through the assistance of a retaining clip comprising an elongated body bent such that the retaining dip has two arms, comprising:
 providing a bushing having a seating member configured to sit within the coupling aperture having a first end and a second end, a top surface and a bottom surface, and an outer surface defining an oblong body, a bore within the seating member running from the bottom surface to the top surface of the seating member and forming a passage sized to receive the shaft of the shift lever, a securing member extending vertically and longitudinally from the first end of the seating member configured to engage the notch in the shift cable end, two angled surfaces rising from the top surface of the seating member to opposite sides of the securing member configured to engage the arms of the retaining clip, two supporting members rising vertically from the top surface of the seating member and running lengthwise along each side of the seating member, a first recess in the bottom surface of the seating member configured to accommodate the front shelf of the shift cable end, a second recess in the bottom surface of the seating member configured to accommodate the semi-circular member, a third recess in the bottom surface of the a seating member configured to accommodate the protruding member, and a fourth recess in the bottom surface of the seating member configured to accommodate the rear shelf;

using tools to remove an existing coupling mechanism from the shift cable end and trim the front shelf and rear shelf of the shift cable end to accommodate the bushing;

inserting the bushing into the coupling aperture by aligning the securing member with the notch and pushing the seating member into the coupling aperture until the recesses in its bottom surface enclose the front shelf and rear shelf of the shift cable end and the seating member is seated within the coupling aperture;

aligning the shaft, the neck, and the head of the shift lever with the bore and inserting the shift lever into the bore until the neck and head of the shift lever have passed through the bore and extend beyond the top surface of the seating member and the base of the shift lever makes contact with the bottom surface of the seating member;

placing the retaining clip on the seating member between the two supporting members such that the arms of retaining clip are reaching over the head of the shift lever; and pressing the arms of the retaining clip down and over the head of the shift lever until the arms of the retaining clip pass beyond the head and retract against the neck of the shift lever and the two angled surfaces of the seating member.

11. A method as in claim 10 wherein the bushing has a seating member that is the same shape as the coupling aperture and of such size to permit the seating member to pass into the coupling aperture.

12. A method as in claim 10 wherein the bushing has a bore that is the same shape as the shaft of the shift lever and of such size to permit the shaft of the shift lever, but not the base of the shift lever, to pass into the bore.

13. A method as in claim 10 wherein the bushing has a securing member that has a height and width equal to the height and width of the notch and is centered on the same axis as the center of the bore.

14. A method as in claim 10 wherein the two supporting members of the bushing are contoured to the shape of the seating member and the coupling aperture, are of a height such that the distance between the bottom surface of the seating member and the top of the two supporting members is equal to the depth of the coupling aperture, and are of a thickness such that the distance between the two supporting members defines a space above the top surface of the seating member large enough to accommodate the retaining clip.

15. A method as in claim 10 wherein the first recess of the bushing is of a shape and size equivalent to the shape and size of the front shelf and is centered on the same axis as the center of the bore.

16. A method as in claim 10 wherein the second recess of the bushing is the same shape and size as the semi-circular member, the second recess is centered on the same axis as the center of the bore, and the second recess borders the bore.

17. A method as in claim 10 wherein the third recess of the bushing is the same shape and size as the protruding member is centered on the same axis as the center of the bore.

18. A method as in claim 10 wherein the fourth recess of the bushing is the same shape and size as the rear shelf.

\* \* \* \* \*